May 3, 1960 E. SNITZER ET AL 2,934,941
HEAT TREATING CONSTITUENT MEASURING MEANS
Filed Dec. 29, 1955 2 Sheets-Sheet 2
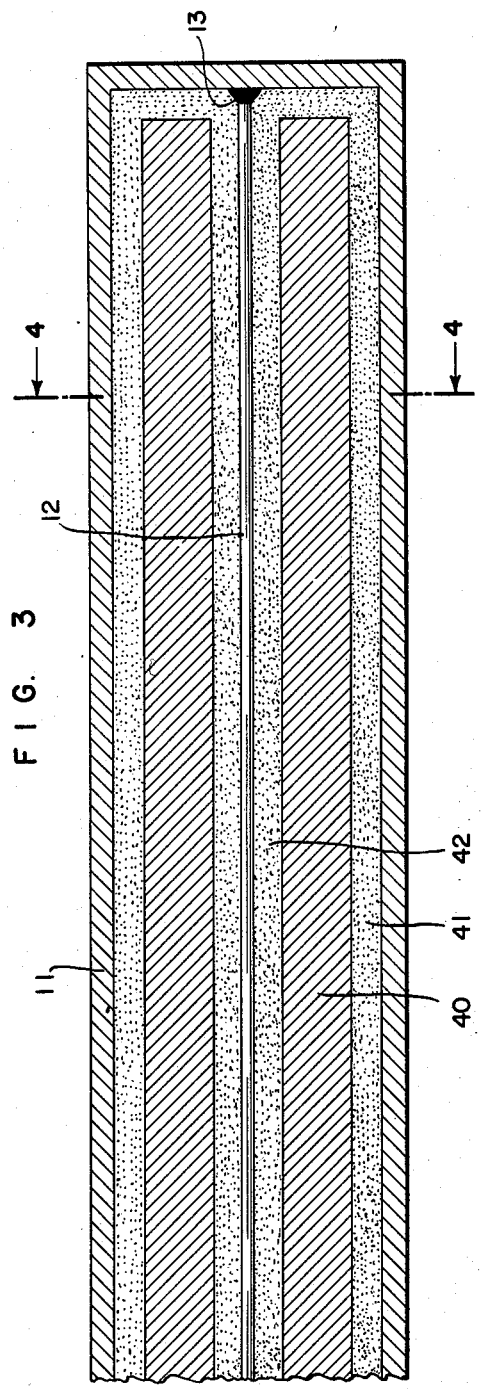
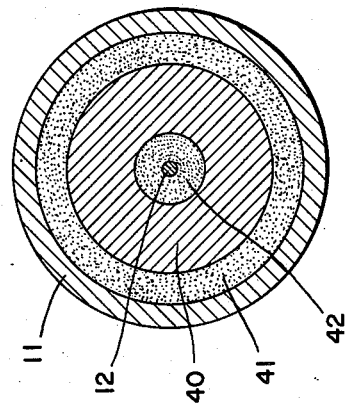
INVENTORS.
GEORGE K. TUCKER
BY ELIAS SNITZER
ATTORNEY.

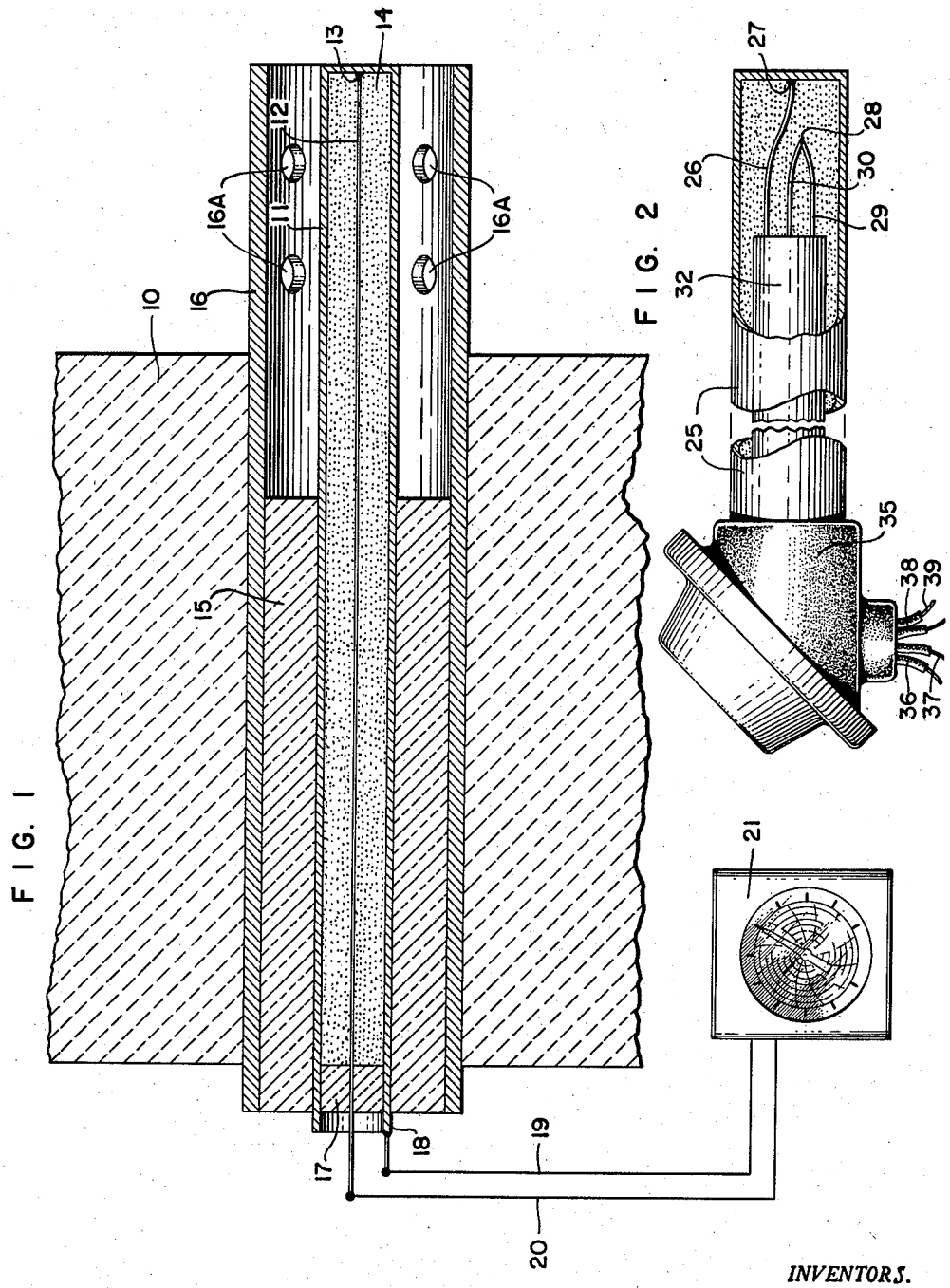

United States Patent Office 2,934,941
Patented May 3, 1960

2,934,941
HEAT TREATING CONSTITUENT MEASURING MEANS

Elias Snitzer and George K. Tucker, Philadelphia, Pa., assignors to Minneapolis-Honeywell Regulator Company, Minneapolis, Minn., a corporation of Delaware Application December 29, 1955, Serial No. 556,359

5 Claims. (Cl. 73—23)

A general object of the present invention is to provide a new and improved apparatus for use in the analysis of a gaseous atmosphere. More particularly, the present invention is concerned with an improved stabilized electrical apparatus for measuring a constituent potential of an atmosphere characterized by its freedom from stray electrical signals and by its high response to constituent potential variation in the atmosphere being analyzed.

In a co-pending application of Richard B. Beard, Serial No. 389,418, filed October 30, 1953, for "Measuring Apparatus," there is disclosed a thermocouple form of gaseous constituent potential measuring apparatus. This apparatus comprises a metallic junction formed by two metals, one of which is capable of sorbing from the atmosphere the particular constituent which is to be measured. The amount of sorbtion and the resultant output electrical potential of the metallic junction varies in accordance with the constituent potential of the atmosphere. This type apparatus finds particular application in heat treating atmospheres as found in nitriding or carburizing furnaces. However, its use is not so limited.

The present invention constitutes an improvement in the type of sensing element disclosed in the above mentioned Beard application, in that a higher response to constituent potential variations may be obtained. Further the present invention discloses a sensing element that is conveniently formed in a manner to minimize the effects of stray electrical fields present in the vicinity of the element. The improved mechanical and electrical protection is achieved primarily by forming the element from a hollow tube which is adapted to extend into the atmosphere under analysis. Positioned within the tube is a secondary element which acts with the tube to form a thermal junction. The improved constituent potential response is achieved by stabilizing the temperature distribution of the sensing element by a special form of heat transfer element in heat transfer relation with the sensing element. This heat transfer element has the characteristic that it will cause the lowest temperature of the sensing element at which it will sorb the heat treating constituent to be well within the atmosphere being analyzed.

It is accordingly a more specific object of the present invention to provide a new and improved thermo-electric type constituent potential measuring apparatus incorporating a hollow tube having a secondary element extending through the tube into engagement with one end thereof and having means for smoothing out the temperature distribution thereof.

Another more specific object of the present invention is to provide a new and improved constituent potential sensing apparatus comprising a hollow metallic tube which is adapted to extend into an atmosphere under analysis where that tube has extending therethrough a secondary metallic element which is protected from the atmosphere and forms with the tube a thermal junction whose potential varies in accordance with the constituent potential in combination with a means for smoothing out the temperature distribution thereof.

Still another more specific object of the present invention is to provide an improved constituent potential sensing apparatus incorporating a hollow elongated tube formed of a metal capable of sorbing the particular constituent under analysis in an atmosphere and incorporating therewith a second member extending through the hollow portion of the tube contacting one end thereof which is sealed to form therewith a thermal junction and wherein the temperature distribution of the tube is stabilized by a thermal conduction member which surrounds the tube in the region where the tube extends into the atmosphere to be analyzed.

A further more specific object of the present invention is to provide an improved constituent potential sensing apparatus comprising an elongated sensing element which projects through a wall into a space where a constituent potential of an atmosphere is to be measured and wherein the element as it extends through the wall has a thermal conductive element surrounding the same where the conductive element extends out to the end of the sensing element to smooth out the temperature distribution along the length of the element.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

Of the drawings:

Figure 1 represents a diagrammatic showing of a preferred embodiment of the invention.

Figure 2 is a modified form of the present invention including temperature compensation;

Figure 3 is a further modification of the apparatus of Figure 1; and

Figure 4 is a cross sectional view of Figure 3 taken in section lines 4—4.

Referring first to Figure 1, the numeral 10 represents a wall through which a sensing element is adapted to project and this wall is presumed to form a part of a complete enclosure in which there is a particular gaseous atmosphere requiring analysis. For purposes of explanation, it will be assumed that the wall 10 is the wall of a carburizing furnace, adapted for use in the heat treatment of iron and steel. Present within the furnace 10 is a carburizing atmosphere and the carbon potential of the atmosphere is to be measured by the sensing element of the present invention. The numeral 11 represents the sensing element of the present invention and this comprises an elongated hollow tube which is closed at the end where it extends into the atmosphere to be analyzed. The tube 11 is preferably formed of iron so that the walls of this tube will react to the carbon present in the carburizing atmosphere. The reaction that takes place is defined generally as a sorbtion process. The sorbtion process involves adsorption of carbon onto the surface of the tube 11 and absorption of the carbon below the surface. Connected to the tube 11 at its sealed end at point 13 is a wire 12 which may be formed of iron or some other metal which will make an effective thermal junction 11—12 with the material in the tube 11. The secondary or inner element 12 is effectively isolated from the atmosphere by the presence of the tube 11 and the insulating material 14 which is packed around the element 12. This insulating material may well take the form of magnesium oxide although other insulating materials will perform satisfactorily. The tube 11 is supported in the wall 10 by a pair of concentric cylinders 15 and 16. The cylinder 15 comprises a cylinder of quartz which is a good electrical insulator and which is in thermal contact with the tube 11 as well as with the cylinder 16. The cylinder 16 is preferably formed of copper and extends outwardly into the furnace to the end of tube 11. This tube 16 may well be perforated as at 16A to permit circulation of the gases about the element 11. Both the cylinders 15 and 16 serve as heat conductors. Insulating material 14 within the tube 11 may be conveniently sealed therein by means of a quartz or other ceramic plug member 17. The element 12 extends through the element 17 to form an output terminal for the apparatus. A further terminal from the apparatus is formed by the walls of the tube 11 with contact being made at 18.

A pair of conductors 19 and 20 are shown connecting the sensing element to a suitable potentiometric measuring apparatus 21. This potentiometric apparatus may well take the form of the self-balancing potentiometric apparatus disclosed in the patent to Walter P. Wills, No. 2,423,540, issued July 8, 1947.

In considering the operation of the present apparatus it should first be noted that with tube 11 projecting into the atmosphere to be analyzed, it will tend to absorb the particular heat treating constituent which is to be measured. The characteristics of the tube 11 will change from the characteristics of the pure metal. In the case of a carburizing atmosphere, where the tube 11 is iron, the iron wire 12 on the inside of this tube acts as one element and the walls of the tube 11 act as a second element to form a thermal junction 11—12. The thermal junction potential is a direct function of the amount of carbon sorbed by the tube 11.

The tube 11 and the shield 16 preferably extend far enough into the furnace so that the end of the thermocouple 11—12 is at the average furnace temperature. The shield 16 functions to average the temperature changes in the furnace and thereby stabilizes the temperature of the element 11 and its output potential. The tube 11 should also preferably be arranged so that the temperature at which it extends through the quartz sleeve 15 is below the temperature at which carburization will take place on the tube 11 in order to achieve maximum output potential. With the element meeting these conditions, the output of the thermocouple will be a function of the carburization. The electrical isolation from strays is provided primarily by the tube 11. Further stray electrical signal effects may be eliminated by the shield 16. This is of particular advantage in electrically heated furnaces.

The potential existing between the element 12 and the tube 11 will be passed by way of the conductors 19 and 20 to the indicating instrument 21 and the indication on instrument 21 may well be the carbon potential of the atmosphere under analysis. The instrument 21 may well be used for purposes of regulating or controlling the carbon potential that is being measured by means well known in the art.

The quartz sleeve 15 functions to electrically isolate the sleeve 16 from the tube 11 and yet provides for heat transfer between the two elements. Should the shield 16 be formed directly adjacent the tube 11, thermal potentials generated at their junction point will be formed due to the fact that the tube 11 is formed of iron and the shield 16 is formed of copper. While this may not be objectionable in some installations, it has been found desirable to provide the insulating separator in the form of the quartz cylinder 15 to make the element more universally adaptable.

In the event that the ambient temperatures on the external side of the wall 10 are high the temperature of the tube 11 at the terminal end 17—18 may well be cooled in any conventional manner as by a water jacket, cooling fins, or the like.

Referring now to Figure 2, there is here shown a sensing element of the same general type as that of Figure 1 with the exception that the elements of the overall sensing device are selected to be of a different material and the apparatus is shown with temperature compensation.

In Figure 2, the numeral 25 represents a hollow cylindrical tube which is adapted to project in the space wherein an atmosphere is to be analyzed. This tube is assumed to be formed of iron so that it is adapted to sorb carbon from the atmosphere under analysis in accordance with the carbon potential of that atmosphere. Positioned within the tube 25 is a secondary element 26 which is assumed here to be constantan. Element 26 is connected to the end of the tube 25 at 27 and forms a thermal junction at that point with the tube 25.

Also positioned within the tube 25 is a thermal junction 28 formed by an iron wire 29 and a constantan wire 30. As the wires 29 and 30 are both positioned within the tube 25, they are effectively isolated from the atmosphere external of the tube 25 so that the thermal junction 28 will have a potential indicative only of the ambient temperature at the outer end of the tube 25. Elements 26, 29, and 30 are shown insulatingly supported by a sleeve 32 which is carried within the tube 25. The elements are electrically connected by way of the head 35 to the output leads 36, 37, 38, 39. These output leads may be in turn connected to a suitable potentiometric measuring apparatus, such as the measuring apparatus mentioned above in the Wills patent. They also may be connected in the manner set forth in the above mentioned Beard application wherein temperature compensation is effected in combination with a constituent potential measuring thermal junction.

The functioning of the apparatus of Figure 2 is essentially the same as that of Figure 1 inasmuch as the tube 25 is formed of iron and will change its physical characteristic from that of pure iron in accordance with the carbon potential of the atmosphere under analysis. This shift in the chemical content of the tube 25 will cause a corresponding shift in the output potential between the tube 25 and the element 26. As with the tube 11 in Figure 1, the tube 25 may also have a thermal stabilizing shield surrounding the tube to stabilize the temperature of the surface of the tube 25 from its outer end at point 27 to the point where it extends through the supporting wall, not shown.

As the thermal junction formed by the tube 25 and the element 26 will have a potential which varies in accordance with ambient temperature variations, it may be desirable, in certain installations where there is a changing ambient temperature, to provide the compensation provided by the thermal junction 28. Since the junction 28 is completely within the tube 25, it will be readily apparent that it will indicate only the ambient temperature. This compensating signal may be opposed to the signal derived from the tube 25 and element 26 so that the net signal will be a true indication of the carbon potential of the atmosphere being analyzed.

Referring now to Figures 3 and 4, there is here shown the basic thermocouple sensing element 11—12 of Figure 1. In this figure, the combination has been modified to the extent that the temperature distribution is stabilized by placing a thermal conducting sleeve or cylinder 40 inside of the tube 11 and insulatingly spacing the same therefrom by magnesium oxide 41. The sleeve 40 is further insulatingly spaced from the rod 12 by magnesium oxide 42.

The sleeve 40 is preferably made of a metal, such as copper and functions in the same general manner as sleeve 16 in Fig. 1 to stabilize the temperature distribution on the tube 11. The sleeve 40 further serves to insure that the point at which the critical temperature appears on tube 11, that is the temperature where sorbtion begins to take place, is well within the space where the tube 11 is sensing the constituent potential. This ensures that the output signal will be a maximum for any particular magnitude of constituent potential.

While, in accordance with the provisions of the statutes, there has been illustrated and described preferred embodiments of the invention, those skilled in the art will understand that changes may be made in the forms of the apparatus disclosed without departing from the spirit of the invention as set forth in the appended claims, and that some features of the present invention may be used to advantage without a corresponding use of other features.

Having now described the invention, what is claimed as new and for which it is desired to obtain by Letters Patent is:

1. A carbon potential sensing means comprising a hollow cylindrical iron tube adapted to project into a chamber enclosing a carburizing atmosphere for reaction therewith, an iron member extending inside and along the length of said tube, iron means sealing the end of said tube and connecting said member to said tube forming a junction which exhibits a thermo-electric output upon reaction of said tube with said atmosphere, and means surrounding a portion of said tube to stabilize the temperature distribution on said sensing means.

2. The invention as set forth in claim 1 wherein said last mentioned means comprises a second tube surrounding said first tube and thermally engaging said tube to stabilize the temperature between the sealed end of said first mentioned tube and the point of engagement by said second tube.

3. A heat treating atmosphere analysis apparatus comprising an elongated hollow metallic tube sealed at one end and adapted to project into a space where said atmosphere is to be analyzed, said tube reacting with a constituent of said atmosphere in accordance with the constituent potential thereof, a metallic member extending along the inner portion of said tube and engaging said tube near said sealed end, to form with said tube a thermal junction the signal output of which varies in accordance with the degree of said reaction, and a thermally conductive sleeve spaced from but surrounding said tube from the point where said tube projects to the end thereof to stabilize the temperature distribution of said tube, said sleeve being provided with apertures through which the atmosphere may contact the projected end of said tube.

4. Apparatus as defined in claim 3 wherein said tube is formed of iron and said metallic member is formed of constantan.

5. A constitutent potential sensing means comprising a hollow cylindrical constituent sensitive metal tube adapted to project into a heat treating atmosphere and react with a constituent thereof, a second metal element extending within said tube and engaging said tube at the end extending into said atmosphere to form an electrothermal junction thereat the output of which varies in accordance with said reaction, and a second hollow cylindrical metal tube positioned within said first mentioned tube coaxially therewith and spaced from said first tube and from said second element, said second tube constituting a heat conducting element formed within said tube and extending along the length thereof from a plane near the end of said first tube to a point external of the plane at which said first tube projects into said atmosphere to cause the temperature along the exposed surface of said first mentioned tube stabilized to be at the atmosphere temperature.

References Cited in the file of this patent

UNITED STATES PATENTS

| 1,584,882 | Marsh et al. | May 18, 1926 |
| 1,660,504 | Grubb | Feb. 28, 1928 |
| 1,849,832 | Herzog et al. | Mar. 15, 1932 |
| 2,541,857 | Besselman et al. | Feb. 13, 1951 |

FOREIGN PATENTS

| 463,674 | Germany | July 31, 1928 |
| 560,829 | Germany | Oct. 7, 1932 |